(12) United States Patent
Nakano et al.

(10) Patent No.: US 8,201,683 B2
(45) Date of Patent: Jun. 19, 2012

(54) CIGARETTE PACKAGE

(75) Inventors: Keiko Nakano, Tokyo (JP); Akira Miyazawa, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 1 day.

(21) Appl. No.: 12/833,535

(22) Filed: Jul. 9, 2010

(65) Prior Publication Data

US 2010/0276312 A1    Nov. 4, 2010

Related U.S. Application Data

(63) Continuation of application No. PCT/JP2009/050220, filed on Jan. 9, 2009.

(30) Foreign Application Priority Data

Jan. 18, 2008    (JP) ................................. 2008-009199

(51) Int. Cl.
*B65D 85/10* (2006.01)

(52) U.S. Cl. ........ 206/267; 206/256; 206/443; 206/457; 229/125.125; 220/213; 220/345.1

(58) Field of Classification Search ................. 206/262, 206/256, 267, 380, 443, 457; 229/160.1, 229/125.12, 125.125; 220/325.1, 345.2, 220/345.5, 213, 345.1
See application file for complete search history.

(56) References Cited

U.S. PATENT DOCUMENTS

| | | | |
|---|---|---|---|
| 369,408 A * | 9/1887 | Mendizabal | 206/249 |
| 820,773 A * | 5/1906 | Fleming | 229/122 |
| 1,163,773 A * | 12/1915 | Ross | 206/1.5 |
| 1,540,553 A | 6/1925 | Graham | |
| 1,631,595 A * | 6/1927 | Kappes | 229/125.125 |
| 2,006,591 A | 7/1935 | Fox | |
| 2,021,755 A | 11/1935 | Spitalny | |
| 2,262,749 A * | 11/1941 | Berwald | 206/380 |
| 2,534,100 A * | 12/1950 | Baumgartner | 220/345.4 |
| 2,786,595 A | 3/1957 | Nelson | |
| 2,928,571 A | 3/1960 | Caruso | |
| 3,074,611 A * | 1/1963 | Tolaas | 229/125.125 |
| 3,325,000 A | 6/1967 | Bryant | 206/256 |
| 3,987,891 A * | 10/1976 | Horvath | 206/1.5 |
| 4,007,828 A * | 2/1977 | Mayled | 206/1.5 |
| 4,113,098 A * | 9/1978 | Howard | 206/540 |
| 4,300,675 A | 11/1981 | Wagner | |
| 5,080,227 A | 1/1992 | Focke | |
| 5,088,599 A * | 2/1992 | Mahler | 206/308.1 |
| 5,275,291 A * | 1/1994 | Sledge | 206/531 |
| D407,972 S * | 4/1999 | Hilton | D9/422 |
| 5,992,621 A | 11/1999 | Grant et al. | |
| D465,729 S * | 11/2002 | Nishimura | D9/422 |

(Continued)

FOREIGN PATENT DOCUMENTS

BE    636793 A    12/1963

(Continued)

*Primary Examiner* — David Fidei

(74) *Attorney, Agent, or Firm* — Birch, Stewart, Kolasch & Birch, LLP

(57) ABSTRACT

A cigarette package according to the present invention has a thin outer case (10) and an inner tray (14) inserted into the outer case (10) in a manner allowing the inner tray to be pulled out, the inner tray (14) having a head (16) functioning as a grip to pull the inner tray (14) out from the outer case (10) and a plurality of grooves (22) holding filter-tipped cigarettes (F) along the direction that the inner tray (14) is pulled out.

6 Claims, 5 Drawing Sheets

U.S. PATENT DOCUMENTS

| | | |
|---|---|---|
| 6,474,469 B1 | 11/2002 | Luton et al. |
| 7,798,321 B2 * | 9/2010 | Wynalda et al. ............ 206/308.1 |
| 7,832,624 B2 * | 11/2010 | Kong ...................... 229/125.125 |
| 7,866,466 B2 * | 1/2011 | Rose et al. .................... 206/267 |

FOREIGN PATENT DOCUMENTS

| | | |
|---|---|---|
| EP | 0421311 A1 | 4/1991 |
| EP | 1 349 798 B1 | 11/2006 |
| FR | 1081649 A | 12/1954 |
| GB | 504584 A | 4/1939 |
| JP | 3-56520 U | 5/1991 |
| JP | 3-212386 A | 9/1991 |
| JP | 5-213340 A | 8/1993 |
| JP | 2004-515426 A | 5/2004 |
| RU | 2003111215 A | 1/2005 |
| WO | 02/48007 A1 | 6/2002 |

* cited by examiner

CIGARETTE PACKAGE

CROSS REFERENCE TO RELATED APPLICATIONS

This application is a Continuation of copending PCT International Application No. PCT/JP2009/050220 filed on Jan. 9, 2009, which designated the United States, and on which priority is claimed under 35 U.S.C. 120. This application also claims priority under 35 U.S.C. 119(a) on Patent Application No. 2008-009199 filed in Japan, on Jan. 18, 2008. The entire contents of all of the above applications are hereby incorporated by reference.

TECHNICAL FIELD

This invention relates to a cigarette package for holding rod-shaped cigarette articles, such as filter-tipped cigarettes, cigarettes, etc.

BACKGROUND ART

Cigarette packages of this type are often provided as hinged lid packages. The hinged lid package has a hinged lid to be opened and closed. With the hinged lid opened, the consumer can remove a cigarette article from the package (patent document 1, for example).

Patent document 1: Japanese Patent Application KOKAI Publication Hei 5-213340

DISCLOSURE OF THE INVENTION

Problem to be Solved by the Invention

The hinged lid packages as described above have been used over so many years that consumers feel tired of their form. There is therefore a hope for development of a novel form of cigarette packages that can increase consumers' buying inclination, while serving a purpose of resource saving.

The primary object of the present invention is to provide a cigarette package in a novel form which can increase consumers' buying inclination and which is reusable by being refilled with cigarette articles.

Means for Solving the Problem

In order to achieve the above object, a cigarette package according to the present invention comprises an outer case in a thin parallelepiped shape with an opening at an end thereof, and an inner tray in a rectangular shape inserted into the outer case in a manner allowing the inner tray to be pulled out through the opening, so that the inner tray has an inserted position and a pull-out position.

The inner tray includes a head located at one end thereof, which projects from the opening when the inner tray is in the inserted position, and functions as a grip to pull the inner tray out, a tray surface located inside the outer case when the inner tray is in the inserted position, and a plurality of holding seats provided on the tray surface to hold rod-shaped cigarette articles.

The above-described cigarette package allows the consumer to pull the inner tray out from the outer case by holding the head of the inner tray between fingers. Pulling the inner tray out in this manner results in exposure of the tray surface of the inner tray, and thus, exposure of the cigarette articles, so that the cigarette articles can be removed from the holding seats of the inner tray.

After all the cigarette articles are removed from the inner tray, the consumer can reuse the cigarette package by refilling the holding seats of the inner tray with new cigarette articles.

In a preferred embodiment, the holding seats are arranged to form an array in the direction of width of the inner tray and capable of holding the cigarette articles along the direction that the inner tray is pulled out. Specifically, the holding seats may be grooves capable of receiving the cigarette articles, individually.

Since the holding seats or grooves hold the cigarette articles individually, removing one or some cigarette articles from the inner tray does not cause the other cigarette articles to be disarranged on the inner tray.

In a preferred embodiment, the opening of the outer case has a front edge extending in a wave shape, and the head of the inner tray has a ceiling surface extending in a wave shape similar to the wave shape that the front edge describes. In this case, the inner tray may also include an arranging means for arranging the cigarette articles on the inner tray to form an undulating array corresponding to the wave shape that the front edge describes.

In this embodiment of the cigarette package, pulling the inner tray out from the outer case results in exposure of the wave shape that the ceiling surface describes and the wavy array of the cigarette articles on the inner tray, in addition to the wave shape that the front edge of the opening of the outer case describes. These wave shapes and wavy array impart an aesthetically-fine appearance to the cigarette package in its open state. Consumers therefore receive a strong impression from the cigarette package in the open state, which can increase the consumers' inclination to buy the cigarette package.

Specifically, the arranging means may include a tail located at the other end of the inner tray opposite the one end, the tail having a bottom surface extending in a wave shape similar to the wave shape that said ceiling surface of the head describes and facing said ceiling surface, so that the filter-tipped cigarettes on the inner tray are securely held between the ceiling surface and the bottom surface. It is desirable that the ceiling surface extend in a smooth wave shape, and that the bottom surface extend in a wave shape defined by plural steps.

The inner tray may be formed of a synthetic resin such that the tray surface includes an elastically deformable region located between the array of the holding seats and the head. The elastically deformable region allows the head to be pushed down through elastic deformation thereof. In spite of the existence of the head, pushing down the head this way allows the cigarette articles held between the ceiling surface and the bottom surface of the inner tray to be easily removed from the inner tray.

The inner tray may further include a stopper for determining the pull-out position. Such stopper prevents the inner tray from coming off the outer case.

Effect of the Invention

The cigarette package according to the present invention takes, in an open state, quite a different form compared with common hinged lid packages, which can increase consumers' buying inclination. Further, the cigarette package according to the present invention is reusable and therefore greatly contributes to resource saving.

EXPLANATION OF REFERENCE CHARACTERS

Figure 1:
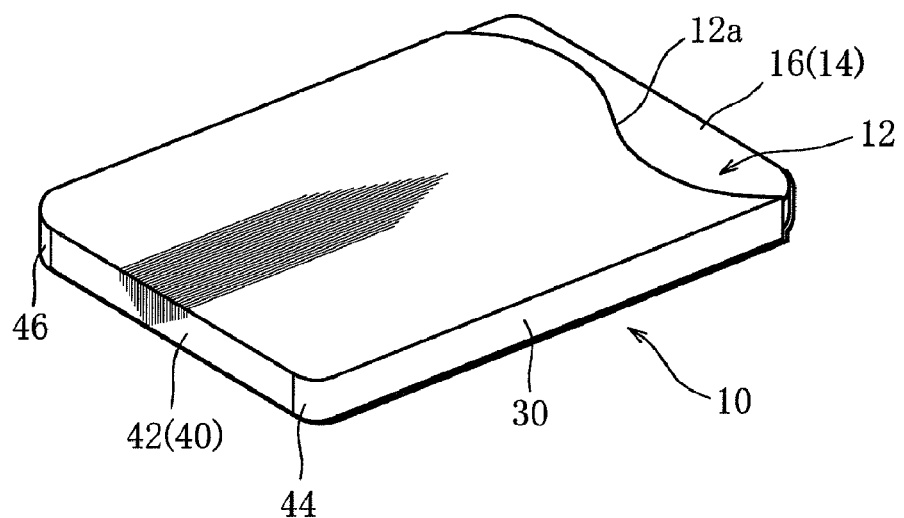
FIG. 1 is a perspective view showing an embodiment of a cigarette package in a closed state.

10: Outer case
12: Opening
12a: Front edge
14: Inner tray
14a: Tray surface
15: Region
16: Head
18: Ceiling surface
19: Tail
20: Bottom surface
22: Groove (holding seat)
26: Flap
48: Flap

BEST MODE OF CARRYING OUT THE INVENTION

Figure 2:
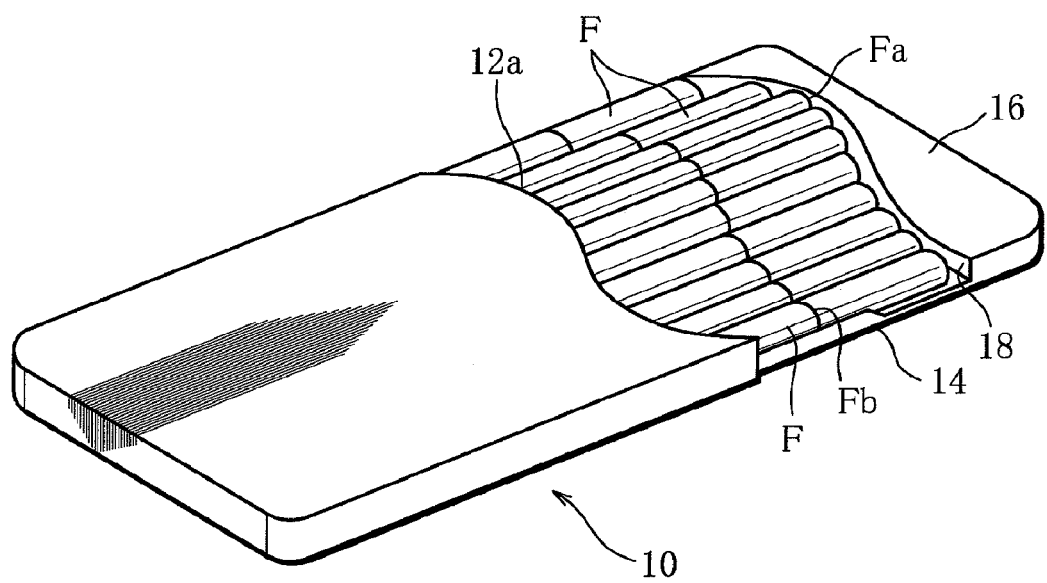
FIG. 2 is a perspective view showing the cigarette package shown in FIG. 1, in an open state.

FIGS. 1 and 2 show an embodiment of a cigarette package.

The cigarette package includes an outer case 10. The outer case 10 is made of paper or synthetic resin. The outer case 10 is in the shape of a thin parallelepiped having opposite one and other ends longitudinally away from each other. The one end of the outer case 10 provides an opening 12, and the other end has a round corner (rounded corner) on the left and right sides.

Specifically, the opening 12 is defined by a front edge 12a, left and right side edges and a rear edge. The front edge 12a extends in a smooth wave shape, specifically, a curve similar to sine curve having one ridge and one trough.

In the outer case 10, a rectangular inner tray 14 is enclosed in a manner allowing the inner tray to be pulled out. As shown in FIG. 1, the inner tray 14 has a head 16 located at one end thereof, which projects from the opening 12 of the outer case 12 even when the inner tray 14 is inserted into the outer case. The head 16 functions as a cover closing the opening 12 of the outer case 10 as well as a grip to pull the inner tray 14 out from the outer case 10.

As clear from FIG. 2, for example ten filter-tipped cigarettes (cigarette articles) F are laid on the inner tray 14. The filter-tipped cigarettes F each have a mouthpiece end Fa and a boundary Fb between tip paper and a cigarette. The tip paper is a connection element connecting the cigarette and a filter plug together.

The filter-tipped cigarettes F are arranged on the inner tray 14 to form an array in the direction of width of the inner tray 14, specifically an undulating array corresponding to the wave shape that the front edge 12a describes. Consequently, the mouthpiece ends Fa as wells as the boundaries Fb of the filter-tipped cigarettes F describe a wavy curve corresponding to the wave shape that the front edge 12a describes.

In order to achieve the above-described arrangement of the filter-tipped cigarettes F, the inner tray 14 has a tail 19 (see FIG. 3) located at the other end opposite the one end thereof, to securely hold the filter-tipped cigarettes between the tail and the head 16. More specifically, the head 16 has a ceiling surface 18 facing toward the inside of the outer case 10. The ceiling surface 18 extends in a wave shape similar to the wave shape that the front edge 12a describes. Thus, when the inner tray 14 is inserted into the outer case 10 as shown in FIG. 1, the head 16 projects from the opening 12 of the outer case 10 with the ceiling surface 18 located inside the outer case 10.

Figure 3:
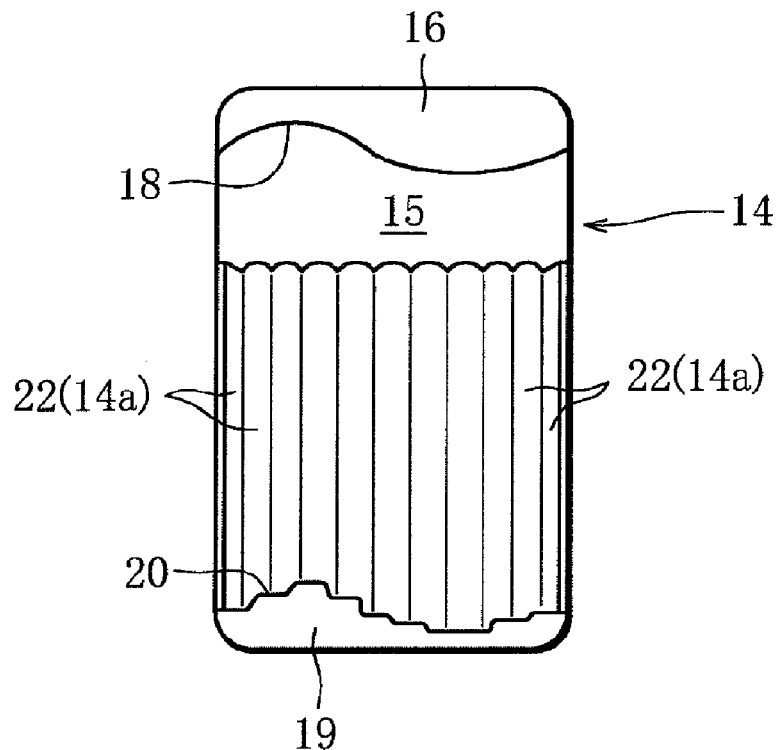
FIG. 3 is a plan view of an inner tray shown in FIG. 2

As shown in FIG. 3, the tail 19 of the inner tray 14 has a bottom surface 20 facing the ceiling surface 18. The bottom surface 20 extends in a wave shape similar to the wave shape that the front edge 12a and the ceiling surface 18 describe. Specifically, unlike the front edge 12a and the ceiling surface 18, the bottom surface 20 is not smooth but has plural steps, which describe the wave shape.

The inner tray 14 also includes a tray surface 14a between the head 16 and the tail 19 to hold the filter-tipped cigarettes F. The tray surface 14a has ten grooves 22. The grooves 22 extend from the bottom surface 20 toward the ceiling surface 18, in the longitudinal direction of the inner tray 14, and thus, in the direction that the inner case 14 is pulled out from the outer case 10.

More specifically, as clear from FIG. 3, the grooves 22 are adjacent to each other in the direction of the width of the inner tray 14 and form holding seats for receiving the filter-tipped cigarettes F individually. The grooves 22 each have a length shorter than the filter-tipped cigarette F, and the tray surface 14a has a flat region 15 between the array of the grooves 22 and the ceiling surface 18.

The above-described inner tray 14 is molded from a synthetic resin. Specifically, the inner tray 14 has hollow swollen portions 16a, 19a at the opposite ends. The swollen portions 16a, 19a are open at the lower side of the inner tray 14. The swollen portion 16a forms the aforementioned head 16, while the swollen portion 19a forms the aforementioned tail 19. The swollen portions 16a, 19b are connected together by a sheet portion 21. The sheet portion 21 has the aforementioned grooves 22 at the upper side.

Figure 4:
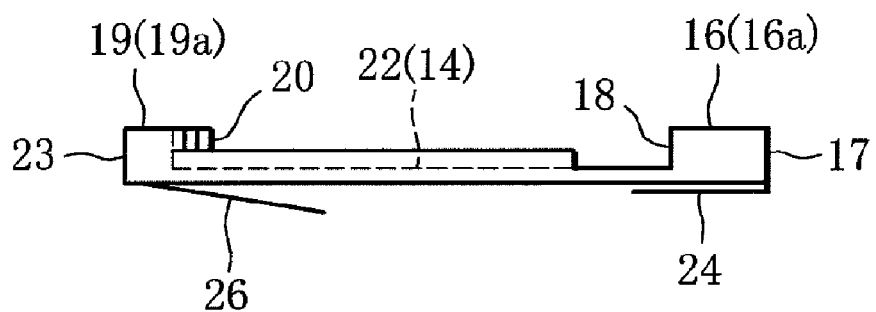
FIG. 4 is a side view of the inner tray shown in FIG. 3.
Figure 5:
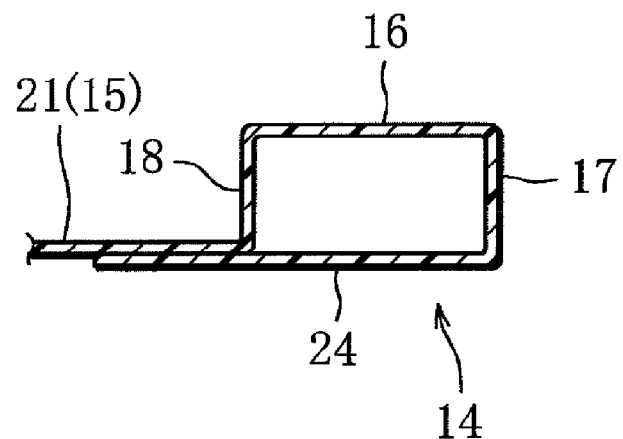
FIG. 5 is a cross-sectional view showing a head of the inner tray.

As shown in FIG. 4, the swollen portion 16a has an inner end wall providing the ceiling surface 18 and an outer end wall 17 opposite the inner end wall. From the lower edge of the outer end wall 17, a flap 24 extends integrally. The flap 24 is folded toward the sheet portion 21 to overlap with the lower surface of the sheet portion 21, as clear from FIG. 5. The flap 24 is glued to the sheet portion 21 to cover the opening of the swollen portion 16a. The flap 24 functions as a reinforcing member increasing the rigidity of the swollen portion 16a or head 16.

Figure 6:
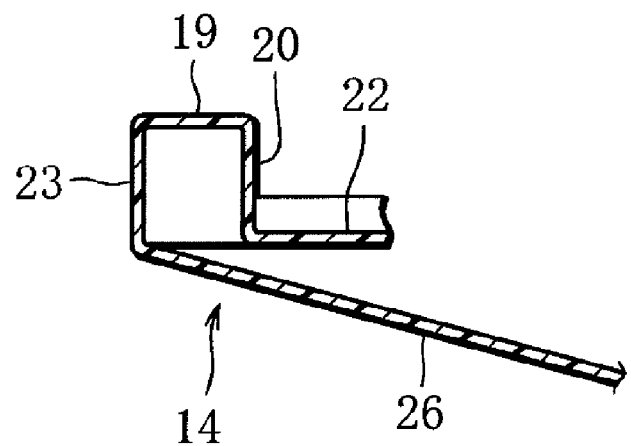
FIG. 6 is a cross-sectional view showing a tail of the inner tray.

As clear from FIG. 6, also the swollen portion 19b has an inner end wall providing the bottom surface 20 and an outer end wall 23 opposite the inner end wall. From the lower edge of the end wall 23, a flap 26 extends integrally. Like the flap 24, the flap 26 is folded toward the sheet portion 21, but unlike the flap 24, the flap 26 is not glued to the sheet portion 21. Consequently, in a free state, the flap 26 is apart from the lower surface of the sheet portion 21. With the inner tray 14 inserted into the outer case 10, however, the flap 26 is elastically deformed and held between the inner surface of the outer case 10 and the lower surface of the inner tray 14, so that the opening of the swollen portion 19b is covered by the flap 26.

Figure 7:
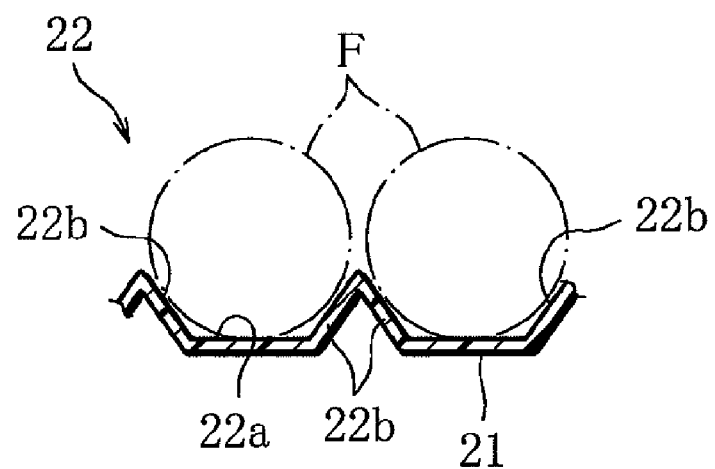
FIG. 7 is a cross-sectional view showing grooves in the inner tray.
Figure 8:
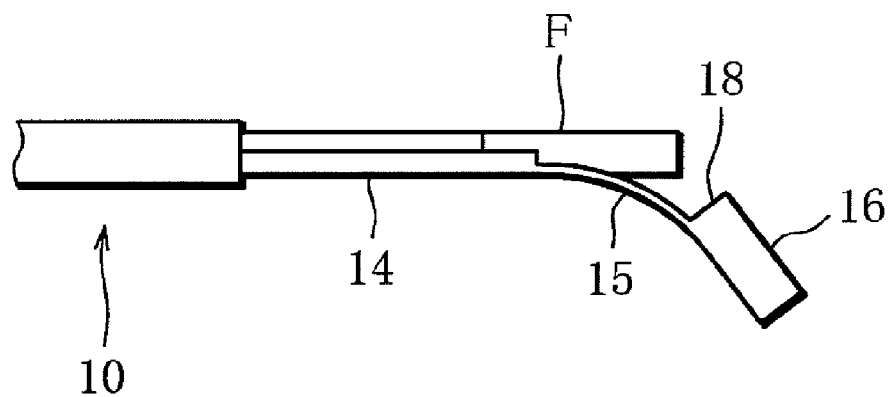
FIG. 8 is a diagram showing the inner tray with the head pushed down.

As shown in FIG. 7, each groove 22 is defined by a flat bottom 22a and left and right side walls 22b, where the side walls 22b slant oppositely. The array of such grooves 22 results in an increased rigidity of the sheet portion 21. The sheet portion 21 has however no grooves 22 in the flat region 15 thereof, which makes the portion 15 elastically deformable. Consequently, the portion 15 can be elastically deformed to warp in a direction away from the plane of the tray surface 14a of the inner tray 14 as shown in FIG. 8, and therefore, the head 16 can be pushed down as viewed in FIG. 8.

Figure 9:
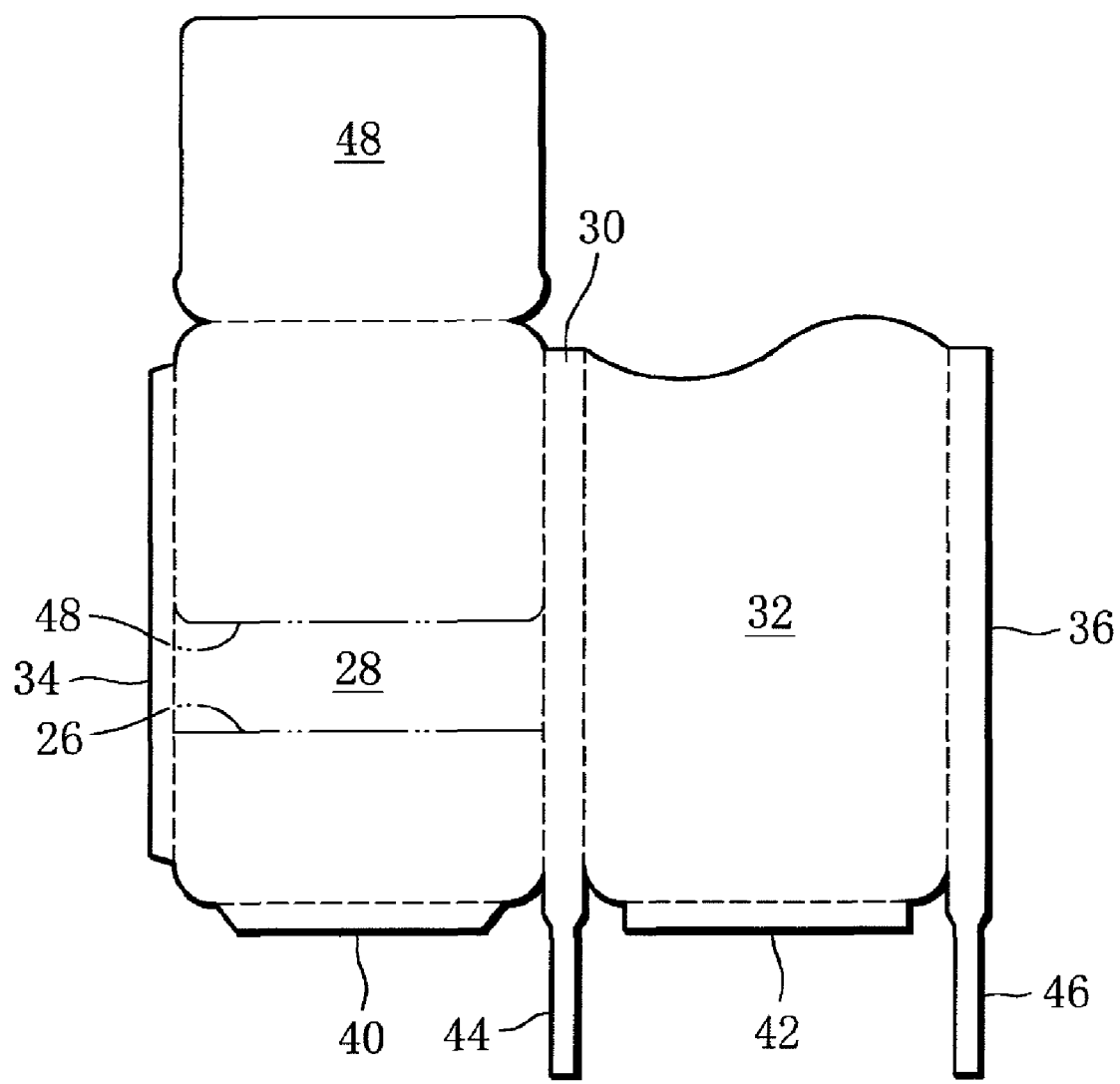
FIG. 9 is a diagram showing a blank from which to form the outer case shown in FIGS. 1 and 2.

FIG. 9 shows a blank from which to form the aforementioned outer case 10.

The blank includes a rear panel 28, a side panel 30 and a front panel 32, where the rear panel 28 and the front panel 32 are joined to the opposite side edges of the side panel 30 by fold lines, respectively. The rear panel 28, the side panel 30 and the front panel 32 are to form the rear wall, one of the side walls and the front wall of the outer case 10, respectively.

As viewed in FIG. 9, the upper edge of the front panel 32 extends in a wave shape, which is to form the front edge 12a of the outer case 10. The lower edge of the front panel 32 and the upper and lower edges of the rear panel 28 each include a circular-arc portion at either end.

An inner side flap 34 and an outer side flap 36 are joined to the outer side edge of the rear panel 28 and the outer side edge of the front panel 32 by fold lines, respectively. These side flaps 34, 36 are to form the other side wall of the outer case 10.

As viewed in FIG. 9, an inner bottom flap 40 and an outer bottom flap 42 are joined to the lower edge of the rear panel 28 and the lower edge of the front panel 32 by fold lines, respectively. These bottom flaps 40, 42 are to form the bottom wall of the outer case 10. Strips 44, 46 extend from the lower end of the side panel 30 and the lower end of the outer side flap 36, respectively. The strips 44, 46 are to provide the aforementioned round corners at either end of the bottom wall of the outer case 10. Further, a flap 48 is joined to the upper edge of the rear panel 28 by a fold line. In FIG. 9, the fold lines are indicated in a single-dot chain line.

Next, the process of folding the above-described blank will be explained.

First, the flap 48 is folded toward the rear panel 28, along the fold line between the flap 48 and the rear panel 28, to overlie the rear panel 28. Then, the above-described inner tray 14 is placed over the rear panel 28 with the flap 48 interposed between. It is to be noted that the inner tray 14 already holds the filtered cigarettes F in the respective grooves 22 thereof.

With the inner tray 14 thus placed over the rear panel 48, the flap 26 of the inner tray 14 and the flap 48 are apart from each other by a predetermined distance (as indicated in a two-dot chain line in FIG. 9).

Then, the panels and flaps other than the rear panel 48 and the flap 48 are folded and the corresponding side flaps are glued together, so that the outer case 10 to enclose the inner case 14 is formed around the inner case 14. At this time, the cigarette package shown in FIG. 1 is obtained.

The consumer can grip the head 16 of the inner tray 14 between his fingers and pull the inner tray 14 out from the outer case 10. During this operation, the flap 26 of the inner tray 14 comes between the flap 48 and the real wall (rear panel 28) of the outer case 10, and when the end of the flap 26 reaches the fold line between the flap 48 and the rear panel 28, the inner tray 14 being pulled out is stopped. The flaps 26, 48 cooperating in this manner therefore constitute a stopper, which determines the maximum length by which the inner tray 14 is pulled out.

In the above-described cigarette package, pulling the inner tray 14 out from the outer case 10 enables removal of the filter-tipped cigarettes F from the inner tray 14. This manner of removing the filter-tipped cigarettes F is quite different from the manner of removing the filter-tipped cigarettes from the common hinged lid package. The present embodiment of the cigarette package thus provides a novel and distinctive package form, which can increase consumers' buying inclination.

On the inner tray 14, the filter-tipped cigarettes F are held in the grooves 22, individually. Thus, removing one or some filter-tipped cigarettes F from the inner tray 14 does not cause the other filter-tipped cigarettes to be disarranged on the inner tray 14.

Further, after all the filter-tipped cigarettes F are removed from the inner tray 14, the consumer can reuse the cigarette package by refilling the grooves of the inner tray 14 with new filter-tipped cigarettes. The cigarette package according to the present invention is thus not intended to be thrown away after use, and therefore greatly contributes to resource saving.

The front edge 12a of the opening 12 of the outer case 10 and the ceiling surface 18 of the inner tray 18 each extend in a wave shape, and the filter-tipped cigarettes F are arranged on the inner tray 14 to form the undulating (wavy) array corresponding to the front edge 12a and the ceiling surface 18. Thus, when the consumer pulls the inner tray 14 out from the outer case 10, not only the consumer himself but also persons around the consumer receive a strong impression from the wave shape that the front edge 13a and the ceiling surface 18 describe, and the wavy array of the filter-tipped cigarettes F corresponding to this wave shape. Such wave shape and wavy array is of great use in increasing the consumers' inclination to buy the cigarette package.

The bottom surface 20 of the inner tray 14 extends in a stepped wave shape, not a smooth wave shape. This allows the filter-tipped cigarettes F to be arranged with their end faces in good and close contact with the bottom surface 20, which satisfactorily prevents deformation of the end faces thereof and falling of shredded tobacco from the end faces. In this connection, it is to be noted that the mouthpiece end of the filter-tipped cigarette F or the end face of the filter, which is brought into contact with the ceiling surface 18 of the inner tray 14, is higher in mechanical strength than the end face of the cigarette. The mouthpiece end therefore does not undergo deformation when brought into contact with the ceiling surface 18.

As stated above, the head 16 of the inner tray 14 can be pushed down by causing elastic deformation to the portion 15, as shown in FIG. 8. Thus, although the filter-tipped cigarettes F are securely held between the ceiling surface 18 and the bottom surface 20 on the inner tray 14, the consumer can easily remove the respective filter-tipped cigarettes F from the inner tray 14 by pushing the head 16 down.

Since the extent to which the inner tray 13 is pulled out is restricted, the inner tray 13 is prevented from being pulled completely out of the outer case 10. Consequently, the filter-tipped cigarettes F are reliably prevented from falling off the inner tray 14.

The present invention is not restricted to the above-described embodiment. For example, the bottom surface of the inner tray 14 may extend in a smooth wave shape, like the ceiling surface 18. Further, the front edge 12a of the opening of the outer case 10 and the ceiling surface 18 of the inner tray 14 may extend in a wave shape other than sine curve, or a shape other than the wave shape.

The invention claimed is:

1. A cigarette package, comprising:
an outer case in a thin parallelepiped shape with an opening at an end thereof, and
an inner tray in a rectangular shape inserted into said outer case in a manner allowing said inner tray to be pulled out through the opening, so that said inner tray has an inserted position and a pull-out position, said inner tray including a head located at one end thereof, projecting from the opening when said inner tray is in the inserted position and functioning as a grip to pull said inner tray out, a tray surface located inside said outer case when said inner tray is in the inserted position, and a plurality of holding seats provided on the tray surface, for holding rod-shaped cigarette articles, wherein the holding seats are arranged to form an array in a direction of a width of said inner tray and capable of holding the cigarette articles along a direction that said inner tray is pulled out, wherein the opening of said outer case has a front edge extending in a wave shape, and the head of said inner tray has a ceiling surface extending in a wave shape similar to the wave shape that the front edge describes, and wherein said inner tray also includes an arranging means for arranging the cigarette articles on the inner tray to form an undulating array corresponding to the wave shape that the front edge describes.

2. The cigarette package according to claim 1, wherein the holding seats are grooves capable of receiving the cigarette articles, individually.

3. The cigarette package according to claim 1, wherein said arranging means includes a tail located at another end of said inner tray opposite the one end of said inner tray, the tail having a bottom surface extending in a wave shape similar to the wave shape that the ceiling surface of the head describes and facing the ceiling surface, so that filter-tipped cigarettes on said inner tray are held between the ceiling surface and the bottom surface.

4. The cigarette package according to claim 1, wherein
the ceiling surface extends in a smooth wave shape, and
the bottom surface extends in a wave shape defined by plural steps.

5. The cigarette package according to claim 3, wherein said inner tray is formed of a synthetic resin such that the tray surface includes an elastically deformable region located between the array of the holding seats and the head, the elastically deformable region allowing the head to be pushed down through elastic deformation thereof.

6. The cigarette package according to claim 1, wherein said inner tray further includes a stopper for determining the pull-out position.

* * * * *